United States Patent [19]

Dix et al.

[11] Patent Number: 5,073,634
[45] Date of Patent: Dec. 17, 1991

[54] TETRACHLOROFERRATES OF BASIC DYES

[75] Inventors: Johannes P. Dix, Weisenheim; Guenter Hansen, Ludwigshafen; Hellmut Kast, Bobenheim-Roxheim, all of Fed. Rep. of Germany

[73] Assignee: BASF Aktiengesellschaft, Ludwigshafen, Fed. Rep. of Germany

[21] Appl. No.: 517,839

[22] Filed: May 1, 1990

[30] Foreign Application Priority Data

May 26, 1989 [DE] Fed. Rep. of Germany ....... 3917257

[51] Int. Cl.$^5$ ...................... C09B 19/00; C09B 69/02; D06P 1/41
[52] U.S. Cl. .................... 544/103; 534/574; 534/607; 534/611; 534/887; 544/75; 544/76; 544/102; 548/455; 548/484; 548/491
[58] Field of Search .................. 544/75, 76, 77, 102, 544/103, 104

[56] References Cited

U.S. PATENT DOCUMENTS 4,336,377 6/1982 Adam et al. ................. 544/75
4,785,088 11/1988 Flohr et al. ................ 540/127

FOREIGN PATENT DOCUMENTS 3111200 9/1982 Fed. Rep. of Germany.
3833195 9/1988 Fed. Rep. of Germany ...... 544/103
508024 7/1971 Switzerland.

OTHER PUBLICATIONS

Balog et al., Chemical Abstracts, vol. 111, No. 89399t (1989).
Proctor et al., Chemical Abstracts, vol. 109, No. 19690r (1988).
Sureau et al., Chemical Abstracts, vol. 72, No. 56700g (1970).
The Chemistry of Synthetic Dyes, vol. 4, Chapters 3 to 5, Academic Press, New York, 1971, K. Venkataraman, pp. 103-340 (1971).

*Primary Examiner*—Mary C. Lee
*Assistant Examiner*—Fiona T. Powers
*Attorney, Agent, or Firm*—Oblon, Spivak, McClelland, Maier & Neustadt

[57] ABSTRACT

Basic dyes of the formula

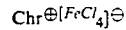

$$Chr^{\oplus}[FeCl_4]^{\ominus}$$

where $Chr^a$ is a dye cation are useful for dyeing acrylonitrile polymers or acid-modified polyesters.

1 Claim, No Drawings

TETRACHLOROFERRATES OF BASIC DYES

The present invention relates to novel basic dyes of the formula I $$Chr^{\oplus}[FeCl_4]^{\ominus} \qquad (I),$$

where $Chr^{\oplus}$ is a dye cation.

In the synthesis of basic dyes, an important purification operation following the synthesis step generally comprises precipitating the dyes from the reaction medium in the form of a sparingly soluble salt. For this purpose, the cationic dyes are frequently converted into trichlorozincate or tetrachlorozincate salts.

Since in this operation contamination of the waste water with zinc ions cannot be ruled out, it is an object of the present invention to provide new sparingly soluble salts of basic dyes which are easy and inexpensive to prepare, safe from the viewpoint of industrial hygiene and unproblematical in relation to their waste water.

We have found that this object is achieved by the basic dyes of the formula I described at the beginning.

Dye cations for the purposes of the present invention are derived for example from the basic dyes mentioned in the Colour Index, from the dyes described in K. Venkataraman, The Chemistry of Synthetic Dyes, Vol. 4, Chapters 3 to 5, Academic Press, New York, 1971, and from the many dyes described in the patent literature which have a cationic group.

Dye cations $Chr^{\oplus}$ are predominantly derived for example from a dye from the class consisting of the monoazo and polyazo dyes, anthraquinone dyes, diphenylmethane dyes, triphenylmethane dyes, xanthene dyes, pyrylium dyes, acridine dyes, azine dyes, oxazine dyes, thiazine dyes, cyanine dyes and naphthostyryl dyes.

Examples of specific dyes from which the dye cation is derived are the dyes C.I. Basic Yellow 11, C.I. Basic Yellow 12, C.I. Basic Yellow 49, C.I. Basic Yellow 51, C.I. Basic Orange 33, C.I. Basic Orange 41, C.I. Basic Orange 54, C.I. Basic Red 23, C.I. Basic Red 29, C.I. Basic Red 39, C.I. Basic Red 46, C.I. Basic Red 51, C.I. Basic Violet 25, C.I. Basic Violet 32, C.I. Basic Violet 35, C.I. Basic Violet 48, C.I. Basic Blue 3, C.I. Basic Blue 40, C.I. Basic Blue 41, C.I. Basic Blue 53, C.I. Basic Blue 54, C.I. Basic Blue 70, C.I. Basic Green 8 and C.I. Basic Brown 12. (The dye names are the usual Colour Index names.)

It is worth mentioning in particular dyes of the formula I where $Chr^{\oplus}$ is derived from a dye selected from the class consisting of dibenzoxazines, methinecyanines, azamethinecyanines, diazamethinecyanines, styryls and diazastyryls.

Such dyes generally conform to the formulae II to VII

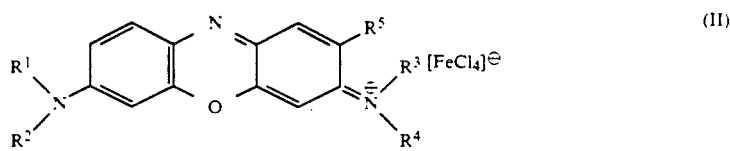
(II)

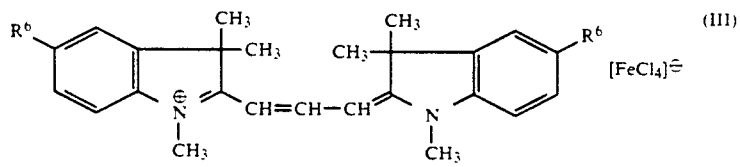
(III)

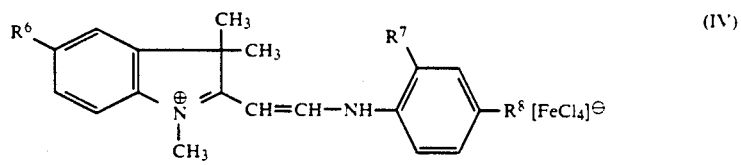
(IV)

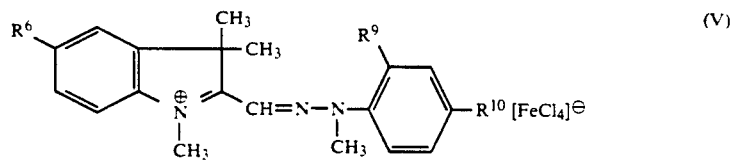
(V)

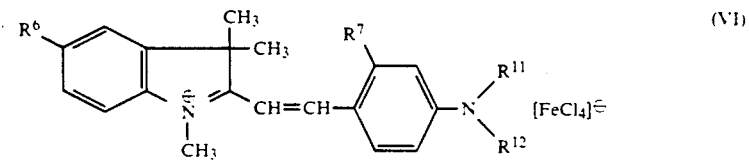
(VI)

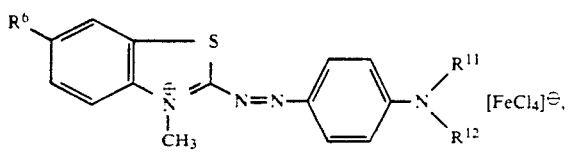

(VII)

where

R[1], R[2], R[3] and R[4] are identical or different and each is independently of the others hydrogen, $C_1$-$C_4$-alkyl, benzyl or 2-cyanoethyl, R[5] is hydrogen or methyl, R[6] is hydrogen, $C_1$-$C_4$-alkyl, $C_1$-$C_4$-alkoxy or chlorine, R[7] and R[8] are identical or different and each is independently of the other hydrogen, $C_1$-$C_4$-alkyl or $C_1$-$C_4$-alkoxy, R[9] and R[10] are identical or different and each is independently of the other hydrogen, $C_1$-$C_4$-alkyl, $C_1$-$C_4$-alkoxy or halogen, and R[11] and R[12] are identical or different and each is independently of the other $C_1$-$C_4$-alkyl, 2-cyanoethyl, 2-($C_1$-$C_4$-alkoxy)ethyl or chloroethyl.

The synthesis of the chromophore cation Chr[a] or of the neutral dyebases derived therefrom is common knowledge (see the references mentioned at the beginning). Moreover, many of the dye salts described therein are commercial dyes.

The basic dyes of the formula I are in general prepared following the synthesis of the dye cation Chr[a] and using as counterions for example halides, such as fluoride, chloride, bromide or iodide, hydrogen sulfate, sulfate, aminosulfate, hydrogen phosphate, phosphate, borate, tetrafluoroborate, methosulfate, ethosulfate, methanesulfonate, benzenesulfonate, o- or p-toluenesulfonate, formate, acetate, propionate, hydroxyacetate, methoxyacetate, lactate, oxalate, maleate, succinate, tartrate, malate, benzoate, citrate, adipate or the anions of diglycolic acid or of addition products of polyalcohols with orthoboric acid. In general iron(III) chloride is added to the reaction mixture. It may be added either in the form of an aqueous solution or preferably without a solvent. If iron(III) chloride is added without a solvent, it is possible to use not only pure iron(III) chloride (FeCl$_3$) but also iron(III) chloride in the form of one of its hydrates (FeCl$_3$.2.5 H$_2$O or FeCl$_3$.6 H$_2$O). The amount of iron(III) chloride depends on the amount of dye cation. Per mole equivalent of dye cation it is generally customary to add from 1 to 1.5, preferably from 1.1 to 1.3, mole equivalents of iron(III) chloride In the course of addition, the basic dyes of the formula I precipitate from the reaction mixture. In some cases it can be of advantage additionally to add sodium chloride or potassium chloride to complete the precipitation.

The dyes thus precipitated are separated off, washed and dried in a conventional manner.

The novel dyes of the formula I are advantageous for dyeing acrylonitrile polymers or acid-modified polyesters, in particular acid-modified polyethylene terephthalates.

The dyeings obtained have bright, pure shades. This is surprising, since the intrinsic color of the tetrachloroferrate anion would be expected to dull the hue.

The novel tetrachloroferrates I are also advantageously convertible by means of the process described in earlier patent application DE-A-3 833 195 into the corresponding monocarboxylic salts, in particular the formates.

The Examples which follow further illustrate the invention.

EXAMPLE 1

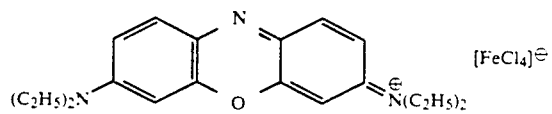

209 g of 2-amino-5-dimethylaminophenol were introduced into 305 ml of 30% by weight hydrochloric acid, and the mixture was cooled down to 10° C. At that temperature 226 ml of 30% strength by weight aqueous sodium nitrite solution were added dropwise and subsequently stirred in over 1 hour. The mixture was then brought to pH 2.2 with 20% strength by weight aqueous sodium carbonate solution. The resulting suspension was added at 70°–78° C. to a mixture of 660 ml of isopropanol and 175 g of 3-diethylaminophenol in the course of 2.5 hours. After stirring at 80° C. for 1 hour and at room temperature for 12 hours, the temperature was raised to 60° C., and 235 g of iron(III) chloride were added. The reaction mixture was then stirred at 80° C. for 30 minutes and cooled down to 30° C., and the resulting precipitate was filtered off with suction and washed twice with 250 ml of methanol each time and then with 520 ml of a 10% strength by weight sodium chloride solution. It was then dried at 70° C. under reduced pressure. Yield: 520 g.

| | Elemental analysis: | | | |
|---|---|---|---|---|
| | C | Cl | Fe | N |
| calculated | 45.99% | 27.21% | 10.69% | 8.05% |
| found | 45.8% | 26.5% | 10.6% | 8.1% |
| Absorption maximum: | 658 nm | | | |

EXAMPLE 2

35.5 g of the dye of the formula

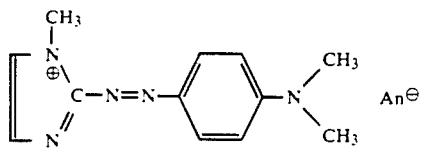

(where An$^\ominus$=CH$_3$SO$_4^\ominus$) were dissolved in 400 ml of water at 60° C. Following addition of 100 ml of a solution of 24.3 g of iron(III) chloride in 50 ml of water, the mixture was stirred at room temperature overnight and then filtered off with suction, and the residue was dried at 60° C. under reduced pressure This gave 42 g of the abovementioned dye (where An$^\ominus$=FeCl$_4^\ominus$).

| Elemental analysis | | | | |
|---|---|---|---|---|
| | C | Cl | Fe | N |
| calculated | 35.31% | 32.14% | 12.64% | 15.84% |
| found | 33.7% | 33.0% | 13.6% | 15.0% |
| Absorption maximum: | 526 nm | | | |

EXAMPLE 3

23.1 g of the dye of the formula

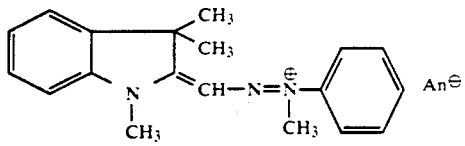

(where $An^{\ominus} = Cl^{\ominus}$), dissolved in 100 ml of water, were admixed at 70° C. with a solution of 24.3 g of iron(III) chloride in 30 ml of water in the course of about 30 minutes. Following 20 minutes, stirring at 70°–75° C., the mixture was cooled to 30° C. and filtered with suction, and the residue was washed twice with 50 ml of ice-water. Drying at 80° C. under reduced pressure left 36 g of the abovementioned dye (where $An^{\ominus} = FeCl_4^{\ominus}$).

| Elemental analysis: | | | | |
|---|---|---|---|---|
| | C | Cl | Fe | N |
| calculated | 46.55% | 28.99% | 11.39% | 8.57% |
| found | 47.1% | 27.9% | 11.0% | 8.7% |
| Absorption maximum: | 428 nm | | | |

The same method gives the tetrachloroferrates of the dyes listed in the following Table:

| Example No. | Dye | Absorption maximum |
|---|---|---|
| 4 | C.I. Basic Yellow 12 | 412 nm |
| 5 | C.I. Basic Yellow 11 | 412 nm |
| 6 | C.I. Basic Yellow 49 | 435 nm |
| 7 | C.I. Basic Orange 33 | 475 nm |
| 8 | C.I. Basic Orange 41 | 452 nm |
| 9 | C.I. Basic Orange 54 | 498 nm |
| 10 | C.I. Basic Red 46 | 528 nm |
| 11 | C.I. Basic Red 29 | 511 nm |
| 12 | C.I. Basic Red 39 | 521 nm |
| 13 | C.I. Basic Red 23 | 527 nm |
| 14 | C.I. Basic Violet 32 | 571 nm |
| 15 | C.I. Basic Violet 35 | 551 nm |
| 16 | C.I. Basic Violet 48 | 525 nm |
| 17 | C.I. Basic Violet 25 | 531 nm |
| 18 | C.I. Basic Blue 70 | 593 nm |
| 19 | C.I. Basic Blue 53 | 584 nm |
| 20 | C.I. Basic Blue 40 | 603 nm |
| 21 | C.I. Basic Blue 54 | 602 nm |
| 22 | C.I. Basic Blue 41 | 609 nm |
| 23 | C.I. Basic Green 8 | 397 nm, 653 nm |
| 24 | C.I. Basic Brown 12 | 444 nm |

We claim:
1. A basic dye of formula I:

$$CHR^+ [FeCl_4]^-$$

where $Chr^+$ is a cation of an oxazine dye.

* * * * *